US009416956B2

(12) United States Patent
Hochman

(10) Patent No.: US 9,416,956 B2
(45) Date of Patent: Aug. 16, 2016

(54) HOUSING HAVING AIR VALVE

(71) Applicant: Revolution Display, LLC, Glendale, CA (US)

(72) Inventor: Jeremy Hochman, Glendale, CA (US)

(73) Assignee: Revolution Display, LLC, Glendale, CA (US)

(*) Notice: Subject to any disclaimer, the term of this patent is extended or adjusted under 35 U.S.C. 154(b) by 678 days.

(21) Appl. No.: 13/907,033

(22) Filed: May 31, 2013

(65) Prior Publication Data

US 2014/0301082 A1     Oct. 9, 2014

Related U.S. Application Data

(60) Provisional application No. 61/654,261, filed on Jun. 1, 2012.

(51) Int. Cl.
| F21V 31/00 | (2006.01) |
| F21V 31/03 | (2006.01) |
| F21V 15/01 | (2006.01) |
| F16K 27/00 | (2006.01) |
| G01M 3/04 | (2006.01) |
| G01M 13/00 | (2006.01) |

(52) U.S. Cl.
CPC .............. F21V 31/005 (2013.01); F16K 27/00 (2013.01); F21V 15/013 (2013.01); F21V 31/03 (2013.01); G01M 3/04 (2013.01); G01M 13/005 (2013.01)

(58) Field of Classification Search
CPC ..... F21V 31/005; F21V 31/03; F21V 15/013; F16K 27/00; G01M 3/04; G01M 13/005
USPC ......... 361/728, 752, 796–800, 679.49, 679.5; 312/257.1, 263, 264, 265.5, 265.6; 362/373, 218, 294, 547
See application file for complete search history.

(56) References Cited

U.S. PATENT DOCUMENTS

| 5,971,757 | A | 10/1999 | Selzer et al. |
| 7,637,628 | B2 | 12/2009 | Budike, Jr. et al. |
| 8,770,785 | B2* | 7/2014 | Vermeland ............ F21V 31/005 362/101 |
| 2008/0089071 | A1* | 4/2008 | Wang .................... F21V 15/013 362/294 |
| 2008/0158862 | A1 | 7/2008 | Wu |
| 2010/0110701 | A1* | 5/2010 | Liu ....................... F21V 17/101 362/373 |
| 2011/0128746 | A1* | 6/2011 | Zheng .................... F21V 15/01 362/373 |
| 2011/0149548 | A1* | 6/2011 | Yang ........................ F21V 5/04 362/84 |

(Continued)

FOREIGN PATENT DOCUMENTS

EP     2384106 A2     11/2011

OTHER PUBLICATIONS

International Search Report and Written Opinion of in International Application No. PCT/US2013/43683 dated Oct. 29, 2013.

(Continued)

*Primary Examiner* — Laura Tso
(74) *Attorney, Agent, or Firm* — Downs Rachlin Martin PLLC

(57) ABSTRACT

Disclosed is a housing includes a housing body and a cap assembly. The cap assembly includes an inner member, an outer member and a resilient compression gasket disposed between the inner and outer members. The inner member has a first valve aperture, the outer member has a second valve aperture and the resilient, compression gasket has a third valve aperture which together form an air valve in the cap assembly.

27 Claims, 2 Drawing Sheets

(56) References Cited

U.S. PATENT DOCUMENTS

2012/0087118 A1*  4/2012  Bailey .................... F21V 29/75
                                                      362/235
2013/0088881 A1   4/2013  Wu et al.

OTHER PUBLICATIONS

Extended Search Report dated Dec. 14, 2015, in corresponding European Patent Application No. 13798181.7, filed Nov. 20, 2014.

* cited by examiner

HOUSING HAVING AIR VALVE

RELATED APPLICATION

This application claims priority to U.S. Patent Application Ser. No. 61/654,261 filed on Jun. 1, 2012, entitled "Housing Having Air Valve," the entirety of which is incorporated herein by this reference

BACKGROUND OF THE INVENTION

1. Field

The present invention relates generally to the mechanical arts. More particularly, the invention relates to a housing having seals and configured to facilitate the testing of the integrity of the seals.

2. Discussion of the Related Art

Often housings, such as housings for electronic devices, including housings for LED light assemblies, must have weatherproof seals. Consequently, there is a definite need for housings that lend themselves to the testing of the efficacy of their seals. There is a further definite need for housings that lend themselves to simple and reliable testing for the integrity of their seals.

SUMMARY OF THE INVENTION

The aforementioned needs are satisfied by the housing having an air valve of the present invention. In some aspects, the housing includes a housing body and a cap assembly. The housing body includes an opening having a perimeter surface. The cap assembly includes an inner member, an outer member and a resilient compression gasket. The inner member has a first side and an opposing second side, with the first side abutting the perimeter surface. The inner member also has a first valve aperture extending from the second side to the first side and ending in the opening. The outer member has a first side and an opposing second side, as well as a second valve aperture extending from the first side to the second side and aligned with the first valve aperture. The resilient, compression gasket is disposed between the second side of the inner member and the first side of the outer member and has a third valve aperture extending from the first side to the second side aligned with the first valve aperture and the second valve aperture.

And in some aspects, the first member is fastened to the second member to form a compression seal between the first member and the second member and the cap assembly is fastened to the perimeter surface to form a seal between the cap assembly and the housing body.

In some embodiments, the inner member includes first and second threaded portions, the outer member includes first and second bores extending from the first side to the second side of the outer member, and the compression gasket includes first and second bores. In such embodiments, the first threaded insert, the first outer member bore and the first compression bore are aligned with one another and the second threaded insert, the second outer member bore and the second compression gasket bore are aligned with one another. Further in such embodiments, a first bolt extends from the second side of the outer member though the first outer member bore and the first compression bore and threadably engages the first threaded insert and a second bolt extends from the second side of the outer member though the second outer member bore and the second compression bore and threadably engages the second threaded insert.

And in some embodiments, the outer member includes third and fourth bores extending from the first side to the second side of the outer member and the housing body includes first and second threaded bores extending through the perimeter surface into the housing body. In such embodiments, the outer member third bore and the perimeter surface first threaded bore are aligned with one another and the outer member fourth bore and the perimeter member second threaded bore are aligned with one another. Further in such embodiments, a third bolt extends from the second side of the outer member though the third outer member bore and threadably engages the first threaded bore and a fourth bolt extends from the second side of the outer member though the fourth outer member bore and threadably engages the second threaded bore.

In some embodiments, at least a portion of the housing body is made of metal or engineering plastic and, in some embodiments, at least a portion of the housing body is made of extruded aluminum. In some embodiments, the perimeter surface is planar and the inner member and the outer member are plates each having a substantially planar first surface and a substantially planar surface opposing second surface. In some embodiments, the resilient, compression gasket is made of silicone. In some embodiments, the silicone compression gasket has a thickness greater than 1 mm and, in some embodiments, a thickness between about 2 mm and about 5 mm.

In one aspect, the housing is a housing for an LED lighting assembly with an air valve. In some embodiments, the housing includes an elongate housing body having a plurality of LED's mounted thereon and, in some embodiments, the elongate housing body includes a printed circuit board and the plurality of LED's are operably mounted on the printed circuit board.

In another aspect, the integrity of a seal in a housing containing at least one seal is tested by inserting the nozzle of a pump into an air valve in the housing, where the housing includes a housing body having an opening, the opening having a perimeter surface and a cap assembly including an inner member having a first side and an opposing second side, the first side abutting the perimeter surface and the inner member having a first valve aperture extending from the second side to the first side, the first valve aperture ending in the opening, an outer member having a first side and an opposing second side, the outer member having a second valve aperture extending from the first side to the second side, the second valve aperture aligned with the first valve aperture, and a resilient, compression gasket disposed between the second side of the inner member and the first side of the outer member and covering the first valve aperture and the second valve aperture, the first valve aperture, the second valve aperture and the compression gasket together forming the air valve, the first member fastened to the second member to form a compression seal between the first member and the second member and the cap assembly fastened to the perimeter surface to form a seal between the cap assembly and the housing body. The air pressure in the housing is then increased and the presence or absence of a leak in the seal is determined.

In some embodiments, the presence or absence of a leak in the seal is determined using a flow meter, such as a leak-down tester, operably connected to the pump and, in some embodiments, the presence or absence of a leak in the seal is determined by withdrawing the nozzle and placing the seal under water or placing a soap solution around the seals.

In some aspects, the housing is a housing for an LED lighting assembly and, in some aspects, the housing is formed of an elongate housing body a portion of the elongate housing body comprises a printed circuit board and the plurality of LED's are operably mounted on the printed circuit board and the elongate housing body having an opening, the opening having a perimeter surface.

DETAILED DESCRIPTION OF THE PREFERRED EMBODIMENTS

Particular embodiments of the invention are described below in detail for the purpose of illustrating its principles and operation. However, various modifications may be made, and the scope of the invention is not limited to the exemplary embodiments described below. For example, while particular attention is given to housings for LED lighting assemblies, it will be appreciated the invention is of equal utility with other types of housings.

Figure 1:
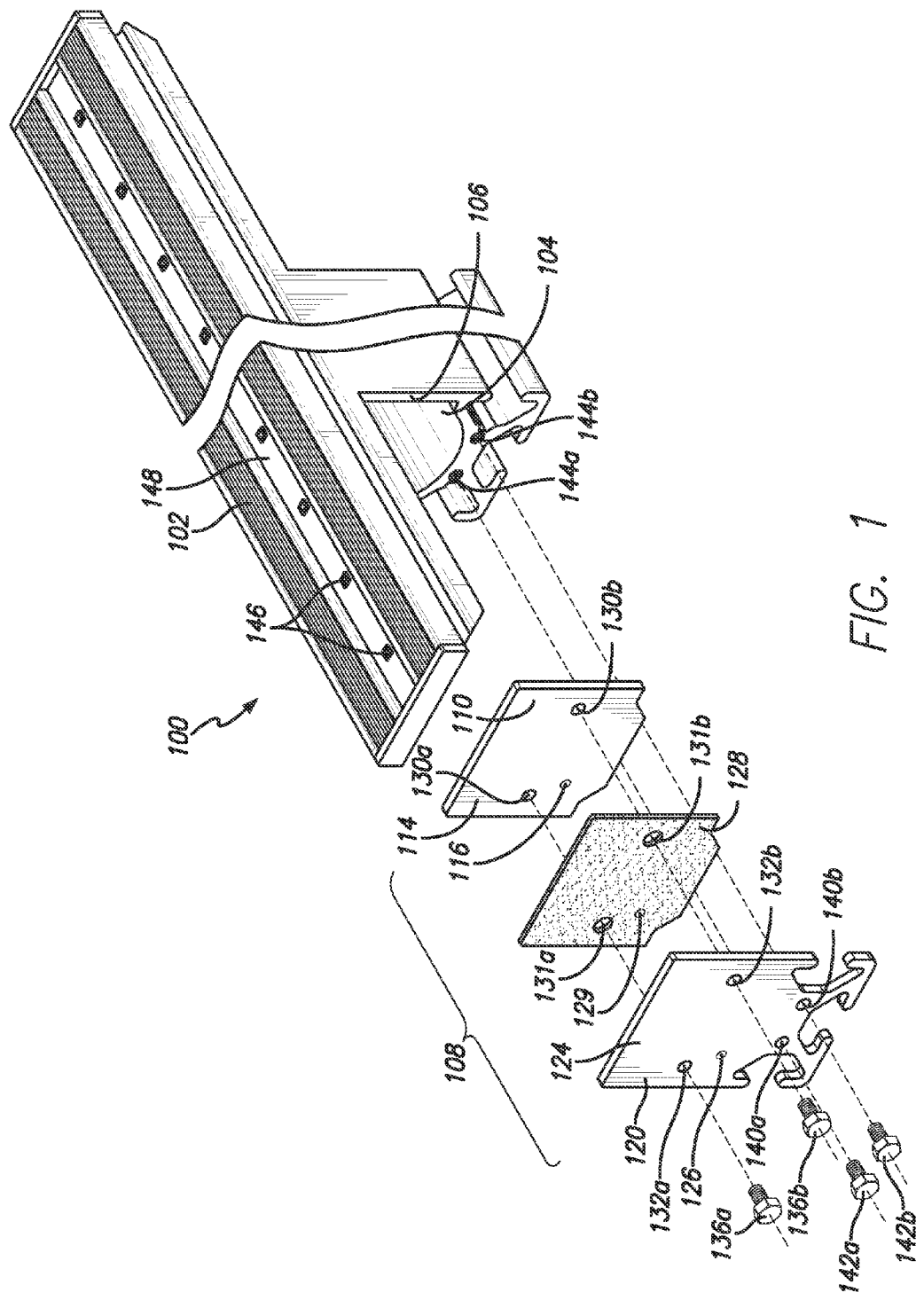
FIG. 1 is an exploded, perspective view of portions of a housing for an LED lighting assembly, in accordance with the invention.
Figure 2A:
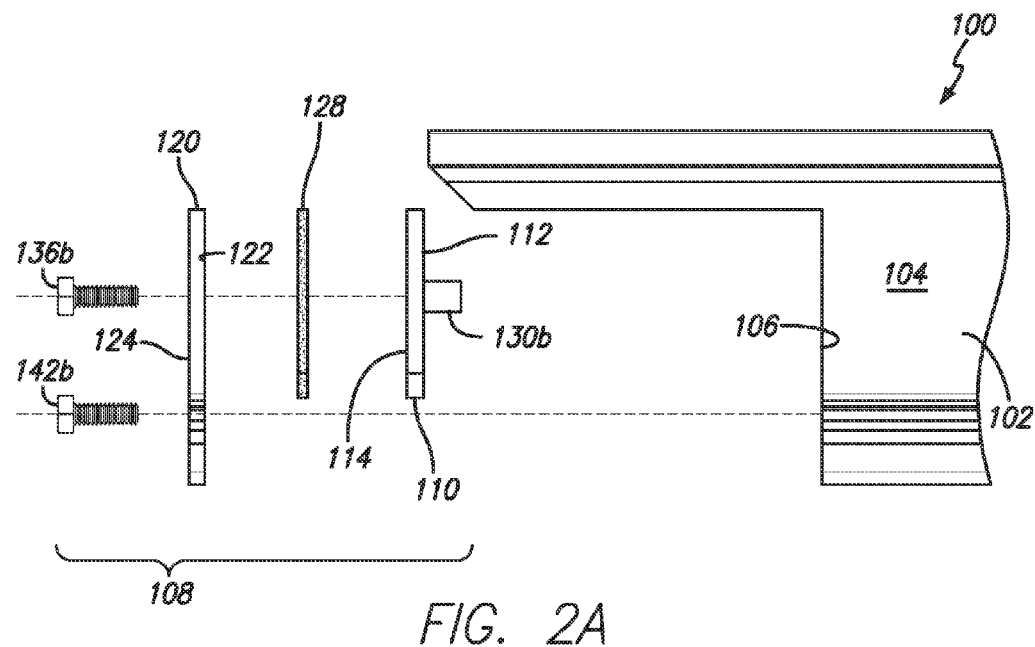
FIG. 2A is an exploded side plan view of a portion of the housing shown in FIG. 1.
Figure 2B:
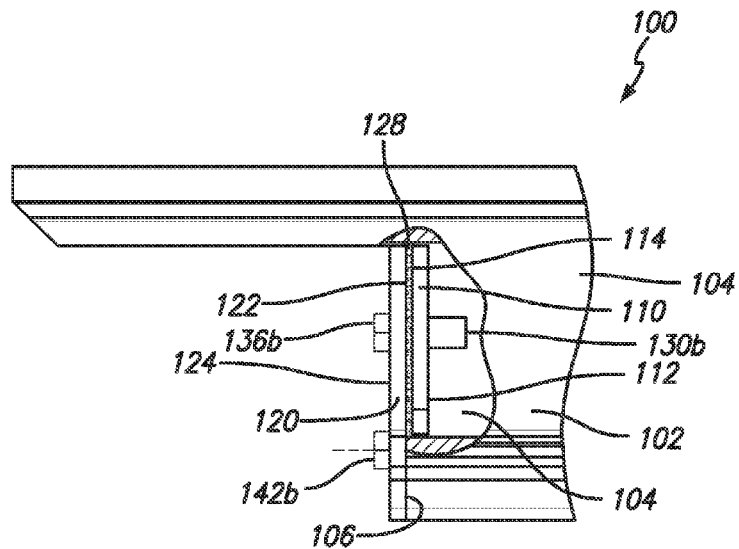
FIG. 2B is a side plan view, partially cutaway, of a portion of the assembled housing shown in FIG. 1.

Shown in FIGS. 1, 2A and 2B are portions of a housing 100 in accordance with the invention. The housing includes a housing body 102. The housing body is made of any suitable material or combinations of materials. Representative materials include metals and engineered plastics. In some embodiments, at least a portion of the housing is made of extruded aluminum.

It is an advantage of the invention, that it can be used with housings having greatly varying shapes and dimensions. For example, in the embodiment shown in FIG. 1, the housing body 102 has an elongated shape that is about 1 deep, 2 inches wide and 24 inches long. The housing body includes an opening 104 having a perimeter surface 106. In the embodiment shown in FIGS. 1, 2A and 2B, the opening is formed in and end of the housing body. And in the embodiment shown in FIGS. 1, 2A and 2B, the perimeter surface is a planar surface. In other embodiments, the perimeter surface is a convex surface, a concave surface or the like.

Also part of the housing 100 is a cap assembly 108 formed in part of an inner member 110 having a first side 112 and an opposing second side 114. The first side has a shape that corresponds to the shape of the perimeter surface and abuts the perimeter surface. For example, in the embodiment shown in FIGS. 1, 2A and 2B, the first side is planar and compliments the planar surface of the perimeter surface. In other embodiments, the first side has a convex surface or concave or similar surface corresponding to the shape of the perimeter surface. A first valve aperture 116 extends from the second side to the first side of the inner member and ends in the opening 104.

Another part of the cap assembly 108 is an outer member 120 having a first side 122 and an opposing second side 124. In some embodiments, the first side of the out member has a shape that corresponds to the shape of the second side 14 of the inner member 110. For example, in the embodiment shown in FIGS. 1, 2A and 2B, the first side of the outer member is planar and compliments the planar surface of the second side of the inner member. In other embodiments, the first side has a convex surface or concave or similar surface corresponding to the shape of the second surface of the inner member. A second valve aperture 126 extends from the second side to the first side of the outer member and is aligned with the first valve aperture 116.

The inner member 110 and the outer member are made of any suitable material or combinations of materials. Representative materials include metals and engineered plastics. In some embodiments, the inner and outer members are metal plates, such as aluminum plates.

A resilient, compression gasket 128 is disposed between the inner member 110 and the outer member 120 and across the first and second valve apertures, 116 and 126, respectively. As illustrated in FIG. 1, prior to assembly, a third valve aperture 129, extends from the second side to the first side of the outer member and is aligned with the first valve aperture 116 and the second valve aperture 126. In some embodiments, the diameter of valve apertures is chosen to accommodate a sports ball inflation needle.

The resilient, compression gasket is made of a material that is compressible, so that a compression seal is formed when the inner member is secured to the outer member. In addition, the material forming the compression gasket is sufficiently resilient that an air valve is formed by the combination of the resilient, compression gasket with the first and second valve apertures. In some embodiments, the resilient, compression gasket is made of silicone. In some aspects, the resilient compression gasket has a thickness of greater than 1 mm and in some aspects the thickness of the resilient, compression gasket is from about 2 to about 5 mm.

The inner member 110 can be fastened to the outer member 120 by any suitable means. In the embodiment shown in FIGS. 1, 2A and 2B, the inner member 110 includes first and second threaded inserts 130a and 130b, respectively (one shown in FIGS. 2A and 2B), from the first side 112 of the inner member into the opening 104. The outer member includes first and second bores 132a and b, respectively, extending from the first side to the second side of the outer member. The compression gasket includes first and second bores, 131a and b, respectively. The first threaded insert, the first outer member bore and the first compression gasket bore are aligned with one another and the second threaded insert, the second outer member bore and the second compression gasket bore are aligned with one another.

In the embodiment shown in FIGS. 1, 2A and 2B, a first bolt 136a extends from the second side 124 of the outer member 120 though the first outer member bore 132a and the first compression bore 134a and threadably engages the first threaded insert 130. A second bolt 136b extends from the second side of the outer member though the second outer member bore 132b and the second compression bore 134b and threadably engages the second threaded insert. When the first and second bolts are tightened and the inner member 110 is fastened to the outer member, the compression gasket is compressed and the third valve aperture is collapsed and a water tight compression seal is formed between the inner and outer members.

The cap assembly 108 can be fastened to the housing body 102 by any suitable means. In the embodiment shown in FIGS. 1, 2A and 2B, third and fourth bores 140a and b, respectively, extend from the first side 122 to the second side 124 of the outer member 120. The third and fourth bores are formed in a portion of the outer member extending beyond the inner member 110 and the resilient compression gasket 128. First and second threaded bores 144a and 144b extend through the perimeter surface into the housing body. The third outer member bore and the first threaded bore are aligned with one another and the fourth outer member bore and the second threaded bore are aligned with one another. A third bolt 142a extends from the second side of the outer member though the third outer member bore and threadably engages the first threaded bore and a fourth bolt 142*b* extends from the second side of the outer member though the fourth outer member bore and threadably engages the second threaded bore. When the bolts are tightened the cap assembly is fastened to the housing body and a seal is formed between the two.

In one aspect, the housing 100 is housing for an LED lighting assembly. As best seen in the embodiment shown in FIG. 1, in some embodiments a plurality of LED's 146 are mounted on a portion of the housing. In representative embodiments, the LED's mounted on an LED panel, a printed circuit board or the like. In the embodiment shown in FIG. 1, a printed circuit board 148 forms a portion of the elongated housing 102, with the plurality of LED's operably connected to the printed circuit board. In some embodiments, the other portion of the housing is formed of a metal, such as extruded aluminum, or an engineered and the printed circuit board is attached to the other portion of the housing using a potting material, such as a silicone potting material.

It is an advantage of the invention, that the integrity of the housing's seals can be simply and effectively tested. In a first step, a nozzle of a pump is inserted through second, third and first valve apertures 126, 129 and 116, respectively. The pump is then used to increase the air pressure inside the housing. Leakage through any defective seals can be measured by any suitable method. In some aspects, the pump is operably connected to a flow meter, such as a leak-down tester. In alternative aspects, leaks can be detected by withdrawing the nozzle and either placing the seal or seals under water and looking for bubbles or placing a soap solution around the seal or seals and looking for air bubbles to appear. It is a further advantage of the invention that the collapsed valve aperture 129 initially facilitates the insertion of the nozzle through the air valve, but because of the resiliency of the compression gasket 128, the seal between the inner and out members is reformed once the nozzle is withdrawn.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

I claim:

1. A housing with an air valve, the housing comprising:
a housing body having an opening, the opening having a perimeter surface and
a cap assembly comprising:
an inner member having a first side and an opposing second side, the first side abutting the perimeter surface and the inner member having a first valve aperture extending from the second side to the first side, the first valve aperture ending in the opening;
an outer member having a first side and an opposing second side, the outer member having a second valve aperture extending from the first side of the outer member to the second side of the outer member, the second valve aperture aligned with the first valve aperture; and
a resilient, compression gasket disposed between the second side of the inner member and the first side of the outer member, the compression gasket having a third valve aperture extending from the first side to the second side, the third valve aperture aligned with the first valve aperture and the second valve aperture,
the inner member fastened to the outer member to form a compression seal between the inner member and the outer member and the cap assembly fastened to the perimeter surface to form a seal between the cap assembly and the housing body.

2. The housing of claim 1 wherein:
the inner member further comprises first and second threaded portions;
the outer member further comprises first and second bores extending from the first side to the second side of the outer member; and
the compression gasket further comprises first and second bores, the first threaded portion, the first outer member bore and the first compression gasket bore aligned with one another, and the second threaded portion, the second outer member bore and the second compression gasket bore aligned with one another; and further comprising
a first bolt extending from the second side of the outer member though the first outer member bore and the first compression gasket bore and threadably engaging the first threaded portion and
a second bolt extending from the second side of the outer member though the second outer member bore and the second compression gasket bore and threadably engaging the second threaded portion.

3. The housing of claim 1 wherein:
the outer member further comprises third and fourth bores extending from the first side to the second side of the outer member and
the housing body further comprises first and second threaded bores extending through the perimeter surface into the housing body, the outer member third bore and the perimeter surface first threaded bore aligned with one another and the outer member fourth bore and the perimeter member second threaded bore aligned with one another, and further comprising
a third bolt extending from the second side of the outer member though the third outer member bore and threadably engaging the first threaded bore and
a fourth bolt extending from the second side of the outer member though the fourth outer member bore and threadably engaging the second threaded bore.

4. The housing of claim 1 wherein at least a portion of the housing body is made of metal or engineering plastic.

5. The housing of claim 4 wherein at least a portion of the housing body is made of extruded aluminum.

6. The housing of claim 1 wherein the perimeter surface is planar and wherein the inner member and the outer member are plates each having a substantially planar first surface and a substantially planar second surface.

7. The housing of claim 1 wherein the resilient, compression gasket is made of silicone.

8. A housing for an LED lighting assembly with an air valve, the housing comprising:
an elongate housing body having a plurality of LED's mounted thereon and the elongate housing body having an opening, the opening having a perimeter surface and
a cap assembly comprising:
an inner member having a first side and an opposing second side, the first side abutting the perimeter surface and the inner member having a first valve aperture extending from the second side to the first side, the first valve aperture ending in the opening;

an outer member having a first side and an opposing second side, the outer member having a second valve aperture extending from the first side of the outer member to the second side of the outer member, the second valve aperture aligned with the first valve aperture; and a resilient, compression gasket disposed between the second side of the inner member and the first side of the outer member, the compression gasket having a third valve aperture extending from the first side of the outer member to the second side of the inner member, the third valve aperture aligned with the first valve aperture and the second valve aperture, the inner member fastened to the outer member to form a compression seal between the inner member and the outer member and the cap assembly fastened to the perimeter surface to form a seal between the cap assembly and the housing body.

9. The housing of claim 8 wherein a portion of the elongate housing body comprises a printed circuit board and the plurality of LED's are operably mounted on the printed circuit board.

10. The housing of claim 9 wherein:
the inner member further comprises first and second threaded portions;
the outer member further comprises first and second bores extending from the first side to the second side of the outer member; and
the compression gasket further comprises first and second bores, the first threaded portion, the first outer member bore and the first compression gasket bore aligned with one another, and the second threaded portion, the second outer member bore and the second compression gasket bore aligned with one another; and further comprising
a first bolt extending from the second side of the outer member though the first outer member bore and the first compression gasket bore and threadably engaging the first threaded portion; and
a second bolt extending from the second side of the outer member though the second outer member bore and the second compression gasket bore and threadably engaging the second threaded portion.

11. The housing of claim 9 wherein:
the outer member further comprises third and fourth bores extending from the first side to the second side of the outer member; and
the housing body further comprises first and second threaded bores extending through the perimeter surface into the housing body, the outer member third bore and the perimeter surface first threaded bore aligned with one another and the outer member fourth bore and the perimeter surface second threaded bore aligned with one another; and further comprising
a third bolt extending from the second side of the outer member though the third outer member bore and threadably engaging the perimeter surface first threaded bore and
a fourth bolt extending from the second side of the outer member though the fourth outer member bore and threadably engaging the perimeter surface second threaded bore.

12. The housing of claim 9 wherein a portion of the housing body is made of metal or engineering plastic.

13. The housing of claim 12 wherein a portion of the housing body is made of extruded aluminum.

14. The housing of claim 9 wherein the perimeter surface is planar and wherein the inner member and the outer member are plates each having a substantially planar first surface and a substantially planar second surface.

15. The housing of claim 9 wherein the resilient, compression gasket is made of silicone.

16. A method for testing the integrity of a seal in a housing containing at least one seal, the method comprising:
inserting a nozzle of a pump into an air valve in a housing, the housing comprising:
a housing body having an opening, the opening having a perimeter surface; and
a cap assembly comprising:
an inner member having a first side and an opposing second side, the first side abutting the perimeter surface and the inner member having a first valve aperture extending from the second side to the first side, the first valve aperture ending in the opening;
an outer member having a first side and an opposing second side, the outer member having a second valve aperture extending from the first side of the outer member to the second side of the outer member, the second valve aperture aligned with the first valve aperture; and
a resilient, compression gasket disposed between the second side of the inner member and the first side of the outer member, the compression gasket having a third valve aperture extending from the first side of the outer member to the second side of the inner member, the first valve aperture, the second valve aperture and the third valve aperture together forming the air valve,
the inner member fastened to the outer member to form a compression seal between the inner member and the outer member and the cap assembly fastened to the perimeter surface to form a seal between the cap assembly and the housing body;
increasing the air pressure in the housing; and
determining the presence or absence of a leak in the seal.

17. The method of claim 16 wherein the presence or absence of a leak in the seal is determined using a flow meter operably connected to the pump.

18. The method of claim 17 wherein the flow meter is a leak-down tester.

19. The method of claim 16 wherein the presence or absence of a leak in the seal is determined by withdrawing the nozzle from the air valve and placing the seal under water or placing a soap solution around the seals.

20. A method for testing the integrity of a seal in a housing containing at least one seal, the method comprising:
inserting a nozzle of a pump into an air valve in a housing for an LED lighting assembly, the housing comprising
an elongate housing body, a portion of the elongate housing body comprising a printed circuit board and a plurality of LED's are operably mounted on the printed circuit board, the elongate housing body having an opening, the opening having a perimeter surface and
a cap assembly comprising:
an inner member having a first side and an opposing second side, the first side abutting the perimeter surface and the inner member having a first valve aperture extending from the second side to the first side, the first valve aperture ending in the opening;
an outer member having a first side and an opposing second side, the outer member having a second valve aperture extending from the first side of the outer member to the second side of the outer member, the second valve aperture aligned with the first valve aperture; and a resilient, compression gasket disposed between the second side of the inner member and the first side of the outer member, the compression gasket having a third valve aperture extending from the first side of the outer member to the second side of the inner member, the first valve aperture, the second valve aperture and the third valve aperture together forming the air valve, the inner member fastened to the outer member to form a compression seal between the inner member and the outer member and the cap assembly fastened to the perimeter surface to form a seal between the cap assembly and the housing body;

increasing the air pressure in the housing; and determining the presence or absence of a leak in the seal.

21. The method of claim 20 wherein the presence or absence of a leak in the seal is determined using a flow meter operably connected to the pump.

22. The method of claim 21 wherein the flow meter is a leak-down tester.

23. The method of claim 20 wherein the presence or absence of a leak in the seal is determined by withdrawing the nozzle from the air valve and placing the seal under water or placing a soap solution around the seal.

24. The housing of claim 1 wherein the resilient, compression gasket has a thickness greater than 1 mm.

25. The housing of claim 24 wherein the resilient, compression gasket has a thickness of from about 2 mm to about 5 mm.

26. The housing of claim 8 wherein the resilient, compression gasket has a thickness greater than 1 mm.

27. The housing of claim 26 wherein the resilient, compression gasket has a thickness of from about 2 mm to about 5 mm.

* * * * *